Oct. 21, 1941.  R. A. L. SELIGMAN  2,260,197
INTERNAL COMBUSTION ENGINE
Filed May 1, 1940
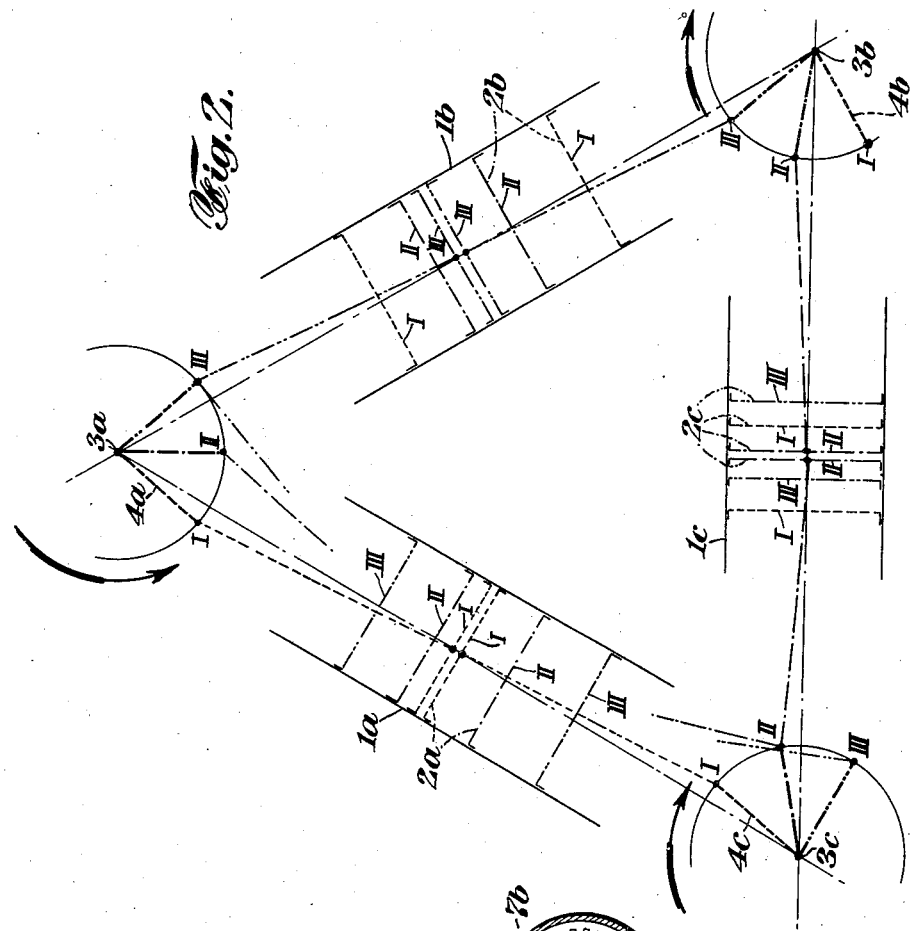
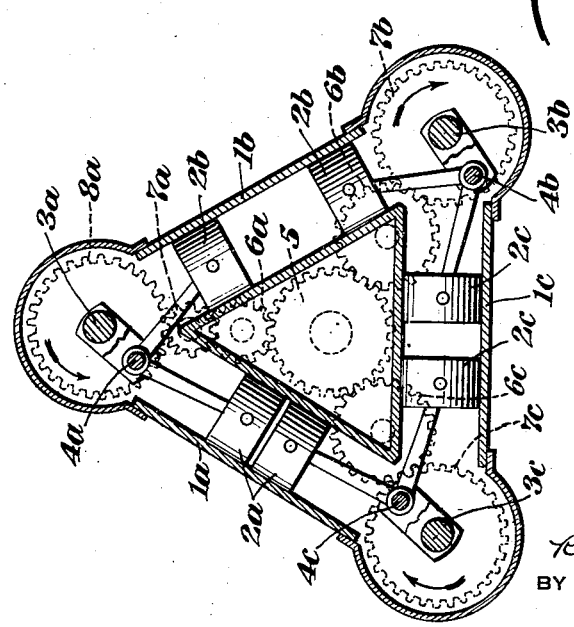
INVENTOR
Roger A. L. Seligman
BY
Kenyon & Kenyon
ATTORNEYS Patented Oct. 21, 1941

2,260,197

UNITED STATES PATENT OFFICE 2,260,197

INTERNAL COMBUSTION ENGINE

Roger Adolphe Leonard Seligman, Neuilly-sur-Seine, France

Application May 1, 1940, Serial No. 332,829
In France June 2, 1939

5 Claims. (Cl. 123—51)

It is known that it is a great advantage, for aviation in particular, for engines to have as reduced a frontal area as possible for a given power. The present invention enables this result to be obtained in a particularly simple and economical manner.

The multi-cylinder engine according to the invention, having two oppositely located pistons in each cylinder, is characterized by the fact that the cylinders are arranged in three longitudinal rows and the geometrical axes of the cylinders of the three rows form, in transverse section, a substantially equilateral triangle, at each of the apices of which there is arranged a crankshaft which is kinematically connected to the corresponding pistons of the two adjacent rows of cylinders.

In order to reduce the length of the complete engine as much as possible, the geometrical axis of a cylinder of each row is arranged in the same transverse plane as the two corresponding cylinders of the other two rows, the complete engine thus being formed by a series of several transverse groups of three cylinders, for each of which groups each of the crankshafts is provided with a single crank-pin which is connected to the two pistons respectively operating in the corresponding ends of the two cylinders which are adjacent the crankshaft considered.

Means are provided whereby, in each transverse group, the crank-pin of each of the crankshafts is located in the correct position of operation relatively to the corresponding crank-pins of the other two crankshafts.

According to a particularly advantageous embodiment, the three crankshafts are kinematically connected together in such a manner that one of them rotates in the opposite direction to the other two.

In each cylinder, there is substituted for the absolute upper extreme position, a practical upper extreme position in which one of the two pistons has not yet reached the absolute extreme position, whereas the other has already gone beyond it.

Taking for example as a reference the crank-pin of the crankshaft the direction of rotation of which is reversed, the practical extreme position specified above is obtained by displacing the two crank-pins of the other two crankshafts a certain angle forwards and backwards respectively.

This angle is of the order of 20°, so that the practical extreme position of the cylinder which is located between the reversed rotation crankshaft and the crankshaft with a forwardly displaced crank-pin is reached when the crank-pin of the first crankshaft is 10° from the theoretical extreme position which the crank-pin of the second has already exceeded by this same angle, whereas the practical extreme position of the cylinder which is located between said second crankshaft and the third is reached 40° after, with a symmetrical position (10°) of the two crank-pins with respect to their theoretical position and, finally, the practical extreme position of the third cylinder is reached a further 40° after, with, this time again, a symmetrical position of the two corresponding crank-pins.

The three practical upper extreme positions, and consequently the three explosions, are therefore obtained in an angle of rotation of the crankshaft of 80° and the balancing of the whole engine is obtained in this case by suitable displacing, on the crankshafts, the crank-pins that correspond to the various transverse groups of three cylinders forming the complete engine.

The invention thus enables identical variations of cylinder capacity to be obtained for the development of the cycle considered and a perfectly even firing in the case of an 18-cylinder engine, which firing occurs in this case every 20°, whereby the variation of the torque is very small.

In each cylinder, the exhaust is controlled by the advanced piston and the inlet by the retarded piston in the case of an engine operating according to the two-stroke cycle.

Other features and peculiarities of the invention will become apparent from the ensuing description taken in conjunction with the accompanying drawing which shows, diagrammatically and merely by way of example, one embodiment of the invention.

In said drawing:

Fig. 1 is an elevational sectional view of a multi-cylinder engine according to the invention.

Fig. 2 is a digram showing the operation of the pistons and of the crank-pins of the crankshafts during one revolution.

A multi-cylinder engine according to the invention comprises a series of transverse groups of three cylinders arranged one after the other, the number of which depends on the power desired.

One of the transverse groups of three cylinders is shown in Fig. 1. As can be seen in said Fig. 1, in each of the cylinders *1a*, *1b*, *1c* there operate two oppositely located pistons *2a*, *2b*, *2c*.

According to the invention, the three cylinders *1a*, *1b*, and *1c* are so arranged that their geometrical axes form an equilateral triangle, at each of the apices of which there is arranged a crankshaft 3a, 3b, 3c, to the crank-pin 4a, 4b, 4c of which are connected the two pistons which operate in the corresponding ends of the two adjacent cylinders of the transverse group considered. It is obvious that each of the crankshafts is common to all the transverse groups and is provided with as many crank-pins as there are transverse groups of cylinders.

According to the invention, a number of arrangements are made whereby each of the crankshafts is located in the correct relative position of operation with respect to the other two crankshafts.

The first of these arrangements consists in making one of the two crankshafts rotate in the opposite direction to the other two. As shown in Fig. 1, this result may readily be obtained by kinematically connecting the three crankshafts to a central gear 5 with which there respectively mesh, the gears 6b, 7b corresponding to the crankshaft 3b; 6c, 7c corresponding to the crankshaft 3c; and 6a, 7a, 8a corresponding to the crankshaft 3a. The presence of an additional gear for this latter crankshaft causes same to rotate in the opposite direction.

According to the second arrangement, there is substituted, in each cylinder, for the absolute extreme position, a practical upper extreme position for which one of the pistons considered has not yet reached the absolute upper extreme position, whereas the other has exceeded it. As shown more particularly in Fig. 2, this result is obtained by suitably displacing the crank-pins of the various crankshafts. If, for example, the crankshaft 4a and the crankshaft 4c were set in what will be called the normal position, they would simultaneously reach the absolute upper extreme position of the cylinder 1a, for which position each of these two crank-pins would be located on the axis of the cylinder 1a. According to the invention, the crank-pin 4a is displaced 10° backwards relatively to said normal position, whereas the crank-pin 4c is displaced this same angle of 10° forwards, as is very clearly apparent from Fig. 2 (see cylinder 1a). The practical upper extreme position of the cylinder 1a is then in position I for which the crank-pin 4a is still 10° from the absolute upper extreme position of the cylinder 1a, whereas the crank-pin 4c has already exceeded this position by this same angle of 10°. In the same manner, the crank-pin 4a is set 20° forwards relatively to the crank-pin 4b (see cylinder 1b of Fig. 2). Finally, said crank-pin 4b is itself set 20° forwards relatively to the crank-pin 4c (see cylinder 1c). It will be observed, moreover, that this angle of 20° is not immutable and that satisfactory results may be obtained even by slightly deviating therefrom.

The operation of the various pistons in the corresponding cylinders can then be readily followed. In position I, the crank-pin 4a is still 10° from the absolute extreme position of cylinder 1a, whereas the crank-pin 4c has already exceeded this position by this same angle of 10° and the crank-pin 4b is 30° from the position it should occupy when the absolute extreme upper position has been reached in cylinder 1c. The explosion being produced in cylinder 1a, each of the crankshaft continues to rotate and thus reaches position II which is the position for which each of the crankshafts has rotated 10°. The crank-pin 4c is then still 10° from the absolute extreme position in cylinder 1c, whereas the crank-pin 4b has exceeded this position by 10°. This is the practical upper extreme position of cylinder 1c, in which the explosion is then produced. For this position II, the crank-pin 4a is located 30° from the position it should occupy for the absolute upper extreme position of cylinder 1b. A further rotation of 40° brings the three crankshafts into position III for which the crank-pin 4b is still 10° from the absolute extreme position of cylinder 1b, whereas the crankshaft 4a has exceeded this position by this same angle of 10°. The explosion is then produced in said cylinder 1b. After this third explosion, each of the crankshafts effects a rotation of 280°, after which they will have returned to position I where the explosion will again occur in cylinder 1a. The three explosions in the same transverse group of three cylinders therefore occur in an angle of 80°, so that each of said groups does not form a balanced engine. Balancing may be obtained by suitably angularly setting the various crank-pins of the crankshafts corresponding to the various transverse groups forming the complete engine.

Thus, for example, in the case of an engine comprising six transverse groups of three cylinders, the crank-pins of the crankshafts may be so set that the explosions occur every 20°, for example, in the following order:

In the 0° position: ignition in cylinder A of the 1st group; in the 20° position: ignition in cylinder B of the 4th group, then in cylinder C of the 1st group, cylinder A of the 5th group, cylinder B of the 1st group, cylinder C of the 5th group, cylinder A of the 3rd group, cylinder B of the 5th group, cylinder C of the 3rd group, cylinder A of the 6th group, cylinder B of the 3rd group, cylinder C of the 6th group, cylinder A of the 2nd group, cylinder B of the 6th group, cylinder C of the 2nd group, cylinder A of the 4th group, cylinder B of the 2nd group and finally cylinder C of the 4th group, and then starting again with cylinder A of the 1st group.

In each of the cylinders, the advanced piston controls the exhaust, whereas the retarded piston controls the inlet.

In the example described above, it has been assumed that the case of an engine operating according to the two-stroke cycle was being considered. It is, however, obvious that the invention may be applied with the same advantages to engines operating according to the four-stroke cycle.

According to a constructional modification, which enables the displacement of the crankshafts relatively to each other and the substitution of a practical upper extreme position for the absolute extreme position to be avoided, it would be possible, in certain cases, to arrange the three cylinders of the same transverse group so that their geometrical axes do not form an equilateral triangle, but a right angle isosceles triangle. By rotating the crankshaft located at the apex of this triangle in the opposite direction to the other two, the explosions may be produced in each cylinder in the 0°, 45° and 90° positions, while in these cylinders, the pistons are in the absolute extreme position.

It is moreover obvious that the invention has only been described and illustrated in an explanatory and nowise limitative manner and that modifications of detail may be made therein without altering its spirit.

I claim:

1. A multi-cylinder internal combustion engine, comprising three longitudinal rows of cylinders, which are so arranged that the geometrical axes of the cylinders of said three rows form, in transverse section, an equilateral triangle, two oppositely located pistons in each of said cylinders, a crankshaft mounted at each of the apices of said triangle, the geometrical axis of a cylinder of one row being arranged in the same transverse plane as the two corresponding cylinders, said engine thus comprising a plurality of transverse groups of three cylinders, a single crank-pin mounted on each of the crankshafts of each of said groups, means for operatively connecting each of said crank-pins to the two pistons respectively operating in the ends of the two cylinders adjacent the corresponding crankshaft, means for causing one of the three crankshafts to rotate in the opposite direction to the other two, and means for substituting, in each cylinder, for the absolute upper extreme position, a practical upper extreme position in which one of the two pistons has not yet reached the absolute extreme position, whereas the other has already exceeded it, whereby the crank-pin of each of the crankshafts of each transverse group is placed in the correct position of operation relatively to the corresponding crank-pins of the other two crankshafts.

2. A multi-cylinder internal combustion engine, comprising three longitudinal rows of cylinders, which are so arranged that the geometrical axes of the cylinders of said three rows form, in transverse section, an equilateral triangle, two oppositely located pistons in each of said cylinders, a crankshaft mounted at each of the apices of said triangle, the geometrical axis of a cylinder of one row being arranged in the same transverse plane as the two corresponding cylinders, said engine thus comprising a plurality of transverse groups of three cylinders, a crank-pin mounted on each of the crankshafts of each of said groups, means for operatively connecting each of said crank-pins to the two pistons respectively operating in the ends of the two cylinders adjacent the corresponding crankshaft, and means for causing one of the three crankshafts to rotate in the opposite direction to the other two, the two crank-pins of the other two crankshafts being respectively set a certain angle forwards and backwards relatively to the crank-pin of said oppositely rotating crankshaft.

3. A multi-cylinder internal combustion engine, comprising three longitudinal rows of cylinders, which are so arranged that the geometrical axes of the cylinders of said three rows form, in transverse section an equilateral triangle, two oppositely located pistons in each of said cylinders, a crankshaft mounted at each of the apices of said triangle, the geometrical axis of a cylinder of one row being arranged in the same transverse plane as the two corresponding cylinders, said engine thus comprising a plurality of transverse groups of three cylinders, a single crank-pin mounted on each of the three crankshafts of each of said groups, means for operatively connecting each of said crank-pins to the two pistons respectively operating in the ends of the two cylinders adjacent the corresponding crankshaft, and means for causing one of the three crankshafts to rotate in the opposite direction to the other two, the two crank-pins of the other two crankshafts being respectively set an angle of the order of 20° forwards and backwards relatively to the crank-pin of said oppositely rotating crankshaft.

4. Multi-cylinder internal combustion engine according to claim 3, wherein the balancing of the engine is obtained by suitably angularly displacing the crank-pins that correspond to the various groups of three cylinders forming the complete engine, on the crankshafts common to said groups.

5. A multi-cylinder internal combustion engine, comprising three longitudinal rows of cylinders, which are so arranged that the geometrical axes of the cylinders of said three rows form, in trnasverse section, an isosceles triangle, two oppositely located pistons in each of said cylinders, a crankshaft mounted at each of the apices of said triangle, the geometrical axis of a cylinder of one row being arranged in the same transverse plane as the two corresponding cylinders, said engine thus comprising a plurality of transverse groups of three cylinders, a single crank-pin mounted on each of the crankshafts of each of said groups, means for operatively connecting each of said crank-pins to the two pistons respectively operating in the ends of the two cylinders adjacent the corresponding crankshaft, and means for causing the crankshaft located at the apex of said isosceles triangle to rotate in the opposite direction to the other two crankshafts, whereby the explosions can be produced in each cylinder in the 0°, 45° and 90° positions, while the pistons of these cylinders are in the absolute extreme position.

ROGER ADOLPHE LEONARD SELIGMAN.